United States Patent
Van Den Broek (10) Patent No.: US 12,284,740 B2
(45) Date of Patent: Apr. 22, 2025

(54) REQUESTING A LIGHTING DEVICE TO CONTROL OTHER LIGHTING DEVICES TO RENDER LIGHT EFFECTS FROM A LIGHT SCRIPT

(71) Applicant: SIGNIFY HOLDING B.V., Eindhoven (NL)

(72) Inventor: Paul Marijn Van Den Broek, Heythuysen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 104 days.

(21) Appl. No.: 18/269,980

(22) PCT Filed: Dec. 21, 2021

(86) PCT No.: PCT/EP2021/087052
§ 371 (c)(1),
(2) Date: Jun. 28, 2023

(87) PCT Pub. No.: WO2022/144243
PCT Pub. Date: Jul. 7, 2022

(65) Prior Publication Data
US 2024/0064883 A1     Feb. 22, 2024

(30) Foreign Application Priority Data

Jan. 4, 2021   (EP) .................................. 21150005

(51) Int. Cl.
*H05B 47/165*   (2020.01)
*H05B 47/155*   (2020.01)
*H05B 47/19*   (2020.01)

(52) U.S. Cl.
CPC ......... *H05B 47/165* (2020.01); *H05B 47/155* (2020.01); *H05B 47/19* (2020.01)

(58) Field of Classification Search
CPC .... H05B 47/165; H05B 47/155; H05B 47/19; H05B 47/1965; H04L 12/2814;
(Continued)

(56) References Cited

U.S. PATENT DOCUMENTS 9,462,663 B2 *  10/2016  Aggarwal ............ H05B 47/125
2015/0189719 A1   7/2015  Archer
(Continued)

FOREIGN PATENT DOCUMENTS

| WO | 2018054893 A1 | 3/2018 |
|----|---------------|--------|
| WO | 2019006070 A1 | 1/2019 |

*Primary Examiner* — Daniel D Chang (57) ABSTRACT

A system (1) for causing at least one of a plurality of lighting devices (31-35) to render light effects specified in a light script is configured to determine for each respective light effect of the light effects an allocation of the respective light effect to one or more first lighting devices (31-33) of the plurality of lighting devices, select, from the plurality of lighting devices, a second lighting device (34) to which none of the light effects has been allocated, and transmit a request to the second lighting device. The request requests the second lighting device to control the one or more first lighting devices to render the light effects and defines light effects for the one or more first lighting devices as specified in the light script.

11 Claims, 4 Drawing Sheets

(58) Field of Classification Search
CPC ............. H04L 2012/285; H04L 12/282; H04L 67/125; H04L 67/60; H04W 4/33; H04W 4/023
See application file for complete search history.

(56) References Cited

U.S. PATENT DOCUMENTS

| | | |
|---|---|---|
| 2015/0256623 A1 | 9/2015 | Ryhorchuk et al. |
| 2020/0022238 A1* | 1/2020 | Aliakseyeu .......... H05B 47/155 |
| 2020/0120779 A1 | 4/2020 | Aggarwal et al. |

* cited by examiner

REQUESTING A LIGHTING DEVICE TO CONTROL OTHER LIGHTING DEVICES TO RENDER LIGHT EFFECTS FROM A LIGHT SCRIPT

CROSS-REFERENCE TO PRIOR APPLICATIONS

This application is the U.S. National Phase application under 35 U.S.C. § 371 of International Application No. PCT/EP2021/087052, filed on Dec. 21, 2021, which claims the benefit of European Patent Application No. 21150005.3, filed on Jan. 4, 2021. These applications are hereby incorporated by reference herein.

FIELD OF THE INVENTION

The invention relates to a system for causing at least one of a plurality of lighting devices to render light effects specified in a light script.

The invention further relates to a method of causing at least one of a plurality of lighting devices to render light effects specified in a light script.

The invention also relates to a computer program product enabling a computer system to perform such a method.

BACKGROUND OF THE INVENTION

The introduction of LED lighting has created more possibilities for rendering light effects at home and in the office. This started with manufacturers enabling users to select a color from a palette of colors and has progressed to enabling users to render dynamic light effects, e.g. with the Philips Hue system. These dynamic light effects may be simple or more complex and are normally specified in a light script. These light scripts may specify light settings such as color and/or light level and their durations for a plurality of different moments. Examples of more complex light scripts are light scripts that are executed when audio and/or video content is being rendered on a media rendering device. The (entertainment) light effects specified in these light scripts have been created to match the content rendered on the media rendering device.

In the Philips Hue system, a mobile device is used for executing the light scripts. However, especially for entertainment light effects, the continued sending of dynamic data to one or more lights could drain the battery of the mobile device and requires proximity to the lights during the dynamics. A solution to this problem is to upload the light script to each luminaire, as disclosed in US 2015/0189719 A1. However, since the luminaire needs to both interpret the light script and control its light source(s), it needs ample resources (e.g. processing power and memory), which makes the luminaire relatively expensive.

US 2020/0022238 A1 discloses a controller for a lighting system, the lighting system comprising one or more luminaires associated with a lighting channel; the controller comprising: a script interpreter configured to interpret a lighting script for rendering on the luminaires; an effect impact determining module configured to determine a visual impact level of each of the lighting effects if rendered as defined by the lighting script unmodified; a script modifier configured to selectively generate, based on the visual impact levels, effect modification data for modifying the visual impact level of at least one of the lighting effects; a lighting controller configured to control the luminaires associated with the lighting channel to render versions of the lighting effects defined by the lighting script, wherein the lighting controller is configured to use the effect modification data to render a modified version of the at least one lighting effect having the modified visual impact level.

SUMMARY OF THE INVENTION

It is a first object of the invention to provide a system, which can be used to render a light script on lighting devices with limited involvement of a mobile device and with limited resources in the lighting devices.

It is a second object of the invention to provide a method, which can be used to render a light script on lighting devices with limited involvement of a mobile device and with limited resources in the lighting devices.

In a first aspect of the invention, a system for causing at least one of a plurality of lighting devices to render light effects specified in a light script comprises at least one transmitter and at least one processor configured to determine for each respective light effect of said light effects an allocation of said respective light effect to one or more first lighting devices of said plurality of lighting devices, select, from said plurality of lighting devices, a second lighting device to which none of said light effects has been allocated, and transmit, via said least one transmitter, a request to said second lighting device, said request requesting said second lighting device to control said one or more first lighting devices to render said light effects, said request defining light effects for said one or more first lighting devices as specified in said light script.

By letting a lighting device that does not participate in the rendering of a (dynamic) light script, e.g. a white dimmable light, control one or more other lighting devices that do participate in the rendering of the (dynamic) light script, the light script can be rendered on the one or more lighting devices with limited involvement of a mobile device and with limited resources in the lighting devices. The system may be a mobile device, but in this case, the mobile device is typically only used for transmitting (e.g. using Bluetooth) the request to control the one or more other lighting devices to the lighting device; it is not necessary for the user keep the mobile device near the lighting devices for running complex dynamics. An allocation to specific lighting devices may be specified in the light script or may be made by system itself (e.g. based on position information specified in the light script per light effect).

Said at least one processor may be configured to receive an original light script, convert said original light script into a different format, and include said converted light script in said request. Alternatively, said at least one processor may be configured to receive an original light script and include said original light script in said request, for example. Alternatively, no light script may be included in the request or even be transmitted to the second lighting device, for example.

Said at least one processor may be configured to select, from said plurality of lighting devices, multiple second lighting devices for which no light effects are specified in said light script and select said second lighting device from said multiple second lighting devices. Often, there are multiple lighting devices which are not involved in the rendering of a (dynamic) light script. In this case, a selection is preferably made from these multiple lighting devices.

Said at least one processor may be configured to select said second lighting device from said multiple second lighting devices based on a resource capability of said multiple second lighting devices, a resource availability on said multiple second lighting devices, and/or a proximity of said multiple second lighting devices to said one or more first lighting devices. This may help ensure the best overall use of resources and the best distributed use of resources. When the second lighting device is selected based on values of multiple parameters (e.g. resource availability and proximity), the values of the different parameters may be weighted differently.

Said at least one processor may be configured to receive resource information from said multiple second lighting devices, said resource information indicating a resource capability of a respective lighting device of said multiple second lighting devices and/or a resource availability on a respective lighting device of said multiple second lighting devices. Said resource information may be indicative of a total amount of memory, an available amount of memory, a processor type, and/or a processor load of said respective lighting device, for example. Certain resource capability information may already be provided by certain conventional lighting devices. For other resource information, e.g. resource availability, standardized messages may need to be extended with new fields.

Said at least one processor may be configured to determine said proximity of said multiple second lighting devices to said one or more first lighting devices based on locations of said multiple second lighting devices and said one or more first lighting devices and/or distances between said multiple second lighting devices and said one or more first lighting devices.

Said at least one processor may be configured to transmit, via said at least one transmitter, a trigger message to said second lighting device after having transmitted said request, said trigger message triggering said lighting device to start controlling said one or more first lighting devices to render said light effects. This allows the second lighting device to prepare for the playback of the light script, as it may need some time to process the light effects, e.g. the light script, communicated to it by the system.

In a second aspect of the invention, a method of causing at least one of a plurality of lighting devices to render light effects specified in a light script comprises determining for each respective light effect of said light effects an allocation of said respective light effect to one or more first lighting devices of said plurality of lighting devices, selecting a second lighting device from said plurality of lighting devices for which no light effects are specified in said light script, and transmitting a request to said second lighting device, said request requesting said second lighting device to control said one or more first lighting devices to render said light effects, said request defining light effects for said one or more first lighting devices as specified in said light script. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for causing at least one of a plurality of lighting devices to render light effects specified in a light script.

The executable operations comprise causing at least one of a plurality of lighting devices to render light effects specified in a light script comprises determining for each respective light effect of said light effects an allocation of said respective light effect to one or more first lighting devices of said plurality of lighting devices, selecting a second lighting device from said plurality of lighting devices for which no light effects are specified in said light script, and transmitting a request to said second lighting device, said request requesting said second lighting device to control said one or more first lighting devices to render said light effects, said request defining light effects for said one or more first lighting devices as specified in said light script.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
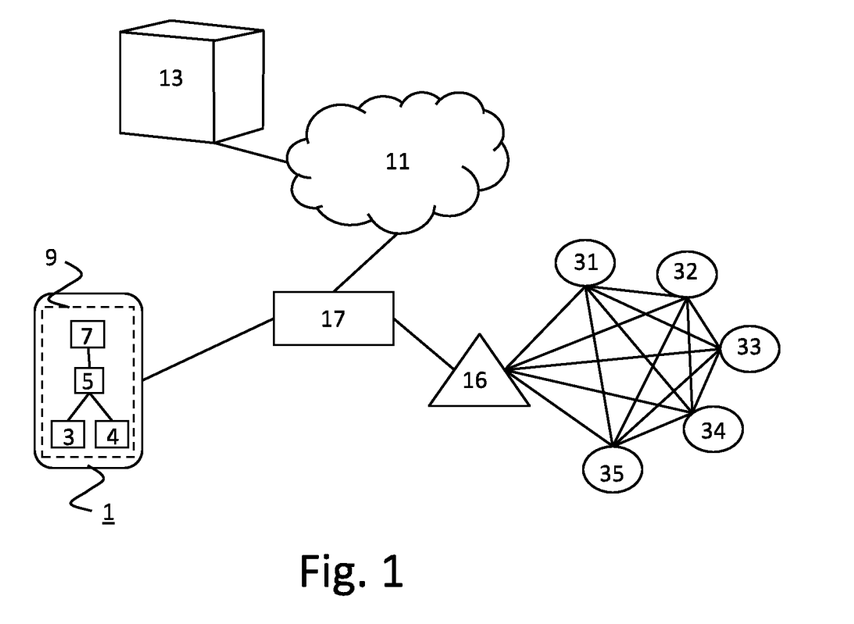
FIG. 1 is a block diagram of an embodiment of the system.

FIG. 1 shows an embodiment of the system for causing at least one of a plurality of lighting devices to render light effects specified in a light script. In this embodiment, the system is a mobile device 1. The mobile device 1 may be able to receive the light script from an Internet server 13, for example.

Mobile device 1 is able to control lighting devices 31-35 via a wireless LAN access point 17 and a bridge 16. Lighting devices 31-35 may be Philips Hue lamps, for example. The lighting devices 31-35 communicate with the bridge 16, e.g. using Zigbee technology. The bridge 16 may be a Philips Hue bridge, for example. The bridge 16 is connected to the wireless LAN access point 17, e.g. via Wi-Fi or Ethernet. The lighting devices 31-35 are also able to communicate with each other directly, e.g. using Zigbee or Bluetooth.

The mobile device 1 comprises a transceiver 3, a transmitter 4, a processor 5, memory 7, and display 9. The processor 5 is configured to obtain data indicative of the light script, for instance from a (local or remote) memory. The processor 5 is configured to determine for each respective light effect of the light effects specified in the light script an allocation of the respective light effect to one or more first lighting devices, e.g. lighting devices 31-33, of the lighting devices 31-35. The light script itself may comprise such an allocation. In this case, the allocation may simply be extracted from the received light script.

Alternatively, the received (original) light script may, for example, not specify any specific lighting device, but specify position/location information like "left", "rear", or "upper right corner" per light effect. The processor 5 may then be configured to allocate the light effects specified in the light script to the registered/available lighting device based on a list of registered/available lighting device. The processor 5 may configured to obtain such a list from the bridge 16, for example. The original light script may be converted to a new light script which specifies the specific lighting devices.

The processor 5 is further configured to select, from the lighting devices 31-35, a second lighting device, e.g. lighting device 34, to which none of the light effects has been allocated, and transmit, via the transmitter 4, a request to the second lighting device. The lighting devices 31-35 comprise at least one second lighting device to which none of said light effects has been allocated. The request requests the second lighting device to control the one or more first lighting devices to render the light effects and defines light effects for the one or more first lighting devices as specified in the light script. The request may include the original light script, the converted light script (if applicable), or may define light effects specified in the received light script in another way.

Thus, not only the mobile device 1 is able to control lighting devices to render light effects, but lighting devices are also able to control each other to render light effects. Since the user of the mobile device 1 may take his mobile device out of the room or house, close apps, and/or restart his mobile device, it has benefit to let the lighting devices control each other. Since the lighting devices that need to render the entertainment light effects preferably conserve their resources for the light effect rendering, it is beneficial to let a lighting device that is not involved in the rendering of the entertainment light effects to control the lighting devices which are.

In other words, the dynamic light effect control is off-loaded from the mobile device 1 to a suitable lighting device that will take control for the sending of the dynamics to one or more other lighting devices, e.g. using BLE or Zigbee. If this controlling lighting device is sent a light script, it will interpret and run the created script. The controlling lighting device will send the dynamic messages required to trigger a dynamic light effect to the allocated lighting devices. This allows the mobile device 1, which might otherwise need to run the complex script, to release control, preserving its battery and allowing it to leave the proximity of the lighting devices rendering the dynamic light effects.

Figure 2:
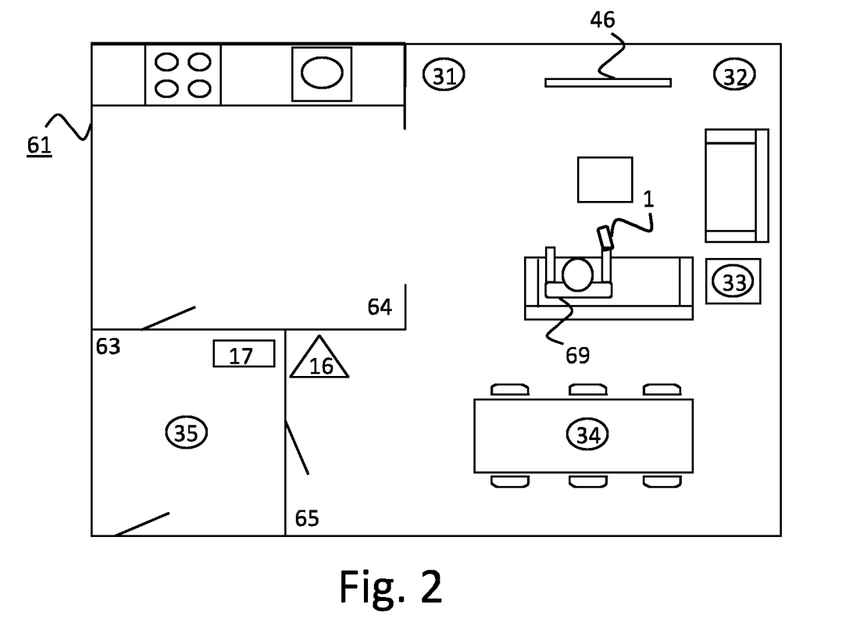
FIG. 2 depicts an example of a space in which the system of FIG. 1 is used.

FIG. 2 depicts an example of a space in which the system of FIG. 1 is used. A floor 61 of a home comprises a hallway 63, a kitchen 64 and a living room 65. Lighting devices 31-34 have been installed in the living room 65 and lighting device 35 has been installed in the hallway 63. Lighting devices 31 and 32 have been installed on respectively the left and right side of the media rendering device 46, which may be a TV, for example. Lighting device 33 has been installed on a table between two couches, where people sit when watching the media rendering device 46. Lighting device 34 has been installed above a dining table.

The wireless LAN access point 17 has been installed in the hallway 63. The bridge 16 has been installed in the living room 65 near the wireless LAN access point 17. A person 69 is watching TV. This person 69 may use his mobile device 1 to select a light script for audio and/or video content that he is going to watch on media rendering device 46. Person 69 may select this audio and/or video content for rendering on the media rendering device 46 using also his mobile device 1 or using a different device, e.g. a remote control. Since the lighting devices 31-33 are close to the media rendering device 46, they are selected to render the entertainment light effects. Since the lighting device 34 is close the lighting devices 31-33, lighting device 34 is selected to control the lighting devices 31-33 to render the entertainment light effects.

For example, a smartphone app running on the mobile device 1 downloads a dynamic light script, determines on which subset of lighting devices to play the dynamic light effects, and then selects the best suitable lighting device that can run the script and that is not involved in rendering the dynamic light effects, The best suitable lighting device may be determined by a combination of device resource capability and/or availability (flash/RAM/CPU) and best proximity towards the to be controlled lighting devices, for example. For instance, the most suitable device might be a device using the latest chipset with most powerful CPU and most RAM/flash memory and the lightest running software application.

In this example, the app then translates the downloaded script to a script suitable to run on an interpreter in the lighting device and transfers this script to the identified lighting device as part of the setup process of the dynamic light script playback. After the script transfer is completed, the app can instruct the device that has received the script to start playback of the light script. The controlling lighting device then interprets the script and sends the dynamic light effects to the lighting device(s) identified in the script by e.g. BLE or Zigbee entertainment commands. Then, the smartphone app is no longer needed to continue the playback of the light script and can sleep and/or leave the room for the dynamics to continue. When the user wants to stop, he indicates this in the app and the mobile device 1 then requests the controlling lighting device to stop the playback of the light script.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen display. The processor 5 may use display 9 to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-35 are controlled by the mobile device 1 via the bridge 16. In an alternative embodiment, one or more of the lighting devices 31-35 are controlled by the mobile device 1 without a bridge, e.g. directly via Bluetooth or Zigbee or via the wireless LAN access point 17. Optionally, the lighting devices 31-35 are controlled via the cloud, e.g. via Internet server 13. The lighting devices 31-35 may be capable of receiving and transmitting Wi-Fi signals, for example.

Figure 3:
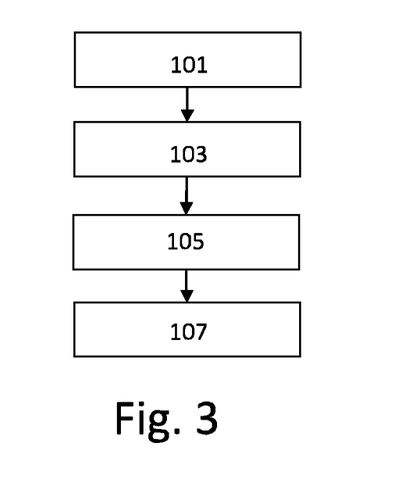
FIG. 3 is a flow diagram of a first embodiment of the method.

A first embodiment of the method of causing at least one of a plurality of lighting devices to render light effects specified in a light script is shown in FIG. 3. The method may be performed by the mobile device 1 of FIG. 1, for example. A step 101 comprises receiving the light script. A step 103 comprises determining for each respective light effect of the light effects an allocation of the respective light effect to one or more first lighting devices of the plurality of lighting devices.

A step 105 comprises selecting a second lighting device from the plurality of lighting devices for which no light effects are specified in the light script. A step 107 comprises transmitting a request to the second lighting device. The request requests the second lighting device to control the one or more first lighting devices to render the light effects and defines light effects for the one or more first lighting devices as specified in the light script.

Figure 4:
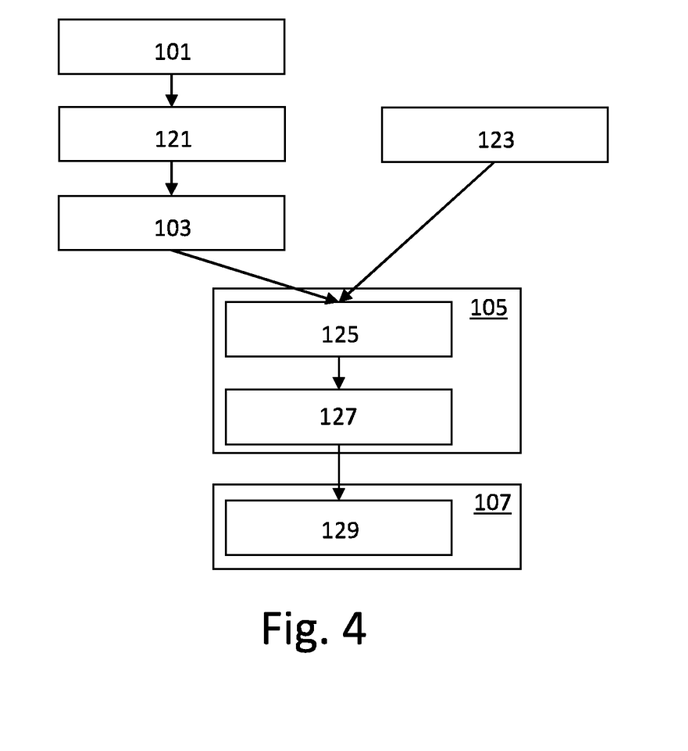
FIG. 4 is a flow diagram of a second embodiment of the method.

A second embodiment of the method of causing at least one of a plurality of lighting devices to render light effects specified in a light script is shown in FIG. 4. Step 101 comprises receiving the light script. A step 121 is performed after step 101. Step 121 comprises converting the original light script received in step 101 into a different format. Step 103 is performed after step 121. Step 103 comprises determining for each light effect specified in the light script an allocation of the respective light effect to one or more first lighting devices of a plurality of lighting devices. The plurality of lighting devices may comprise all the lighting devices present in a home, for example.

A step 123 is performed at least partly in parallel with one or more of steps 101, 121, and 103. In an alternative embodiment, step 123 is performed before step 101, after step 103 or in between steps 101 and 121 or in between steps 121 and 103. Step 123 comprises receiving resource information from the plurality of lighting devices. The resource information indicates a resource capability of a respective lighting device of the plurality of lighting devices and/or a resource availability on a respective lighting device of the plurality of lighting devices. The resource information may be indicative of a total amount of memory, an available amount of memory, a processor type, and/or a processor load of the respective lighting device, for example.

Step 105 is performed after step 103 and step 123 have been performed. Step 105 comprises selecting a second lighting device from the plurality of lighting devices for which no light effects are specified in the light script, as determined in step 103. In the embodiment of FIG. 4, step 105 is implemented by steps 125 and 127.

Step 125 comprises selecting, from the plurality of lighting devices, multiple second lighting devices for which no light effects are specified in the light script, as determined in step 103, and select the second lighting device from the multiple second lighting devices. Step 127 comprises selecting the second lighting device from the multiple second lighting devices based on the resource capability of the multiple second lighting devices determined in step 123 and/or the resource availability on the multiple second lighting devices determined in step 123.

Step 107 is performed after step 105. Step 107 comprises transmitting a request to the second lighting device. In the embodiment of FIG. 4, step 107 is implemented by a step 129. The request transmitted in step 129 comprises the converted light script obtained in step 121 and requests the second lighting device selected in step 127 to control the one or more first lighting devices to render the light effects specified in the converted light script.

Figure 5:
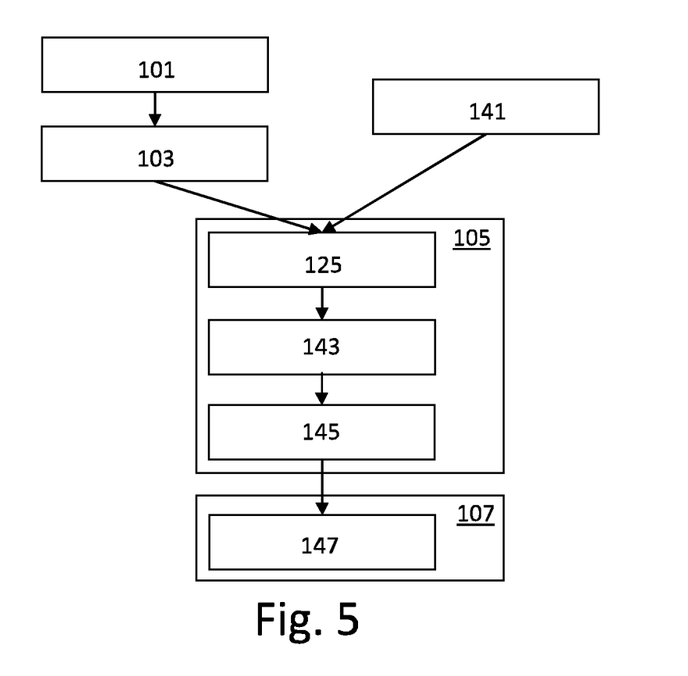
FIG. 5 is a flow diagram of a third embodiment of the method.

A third embodiment of the method of causing at least one of a plurality of lighting devices to render light effects specified in a light script is shown in FIG. 5. Step 101 comprises receiving a light script. Step 103 is performed after step 101. Step 103 comprises determining for each light effect specified in the light script an allocation of the respective light effect to one or more first lighting devices of a plurality of lighting devices. The plurality of lighting devices may comprise all the lighting devices present in a home, for example.

Step 141 is performed at least partly in parallel with step 101 and/or step 103. In an alternative embodiment, step 141 is performed before step 101, after step 103, or in between steps 101 and 103. Step 141 comprises determining locations of the plurality of lighting devices and/or distances between the plurality of lighting devices. The locations of the lighting device may be (e.g. roughly) indicated in app by a user. The distances between the lighting devices may then be determined based on these indicated locations. Alternatively, distances between lighting devices may be estimated based on received signal strength information, for example.

Step 105 is performed after step 103 and step 141 have been performed. Step 105 comprises selecting a second lighting device from the plurality of lighting devices for which no light effects are specified in the light script, as determined in step 103. In the embodiment of FIG. 5, step 105 is implemented by steps 125, 143, and 145.

Step 125 comprises selecting, from the plurality of lighting devices, multiple second lighting devices for which no light effects are specified in the light script, as determined in step 103. Step 143 comprises determining the proximity of the multiple second lighting devices selected in step 125 to the one or more first lighting devices, e.g. in meters, based on the locations determined in step 141 and/or the distances determined in step 141.

Step 145 comprises selecting the second lighting device from the multiple second lighting devices selected in step 125 based on the proximity of the multiple second lighting devices to the one or more first lighting devices, as determined in step 143. For example, the second lighting device with the shortest distance to the farthest of the one or more first lighting devices (relative to the respective second lighting device) may be selected.

Step 107 is performed after step 105. Step 107 comprises transmitting a request to the second lighting device. In the embodiment of FIG. 5, step 107 is implemented by a step 147. The request transmitted in step 147 comprises the original light script received in step 101 and requests the second lighting device selected in step 145 to control the one or more first lighting devices to render the light effects specified in the original light script.

In the embodiment of FIG. 5, the locations of all the lighting devices and/or the distances between each of the lighting devices are determined in step 141. In an alternative embodiment, the locations of only the multiple second lighting devices selected in step 125 and the one or more first lighting devices determined in step 103 and/or the distances between only the multiple second lighting devices selected in step 125 and the one or more first lighting devices determined in step 103 are determined in step 141. In this alternative embodiment, step 141 is performed between steps 125 and 143 or step 141 is combined with step 143.

Figure 6:
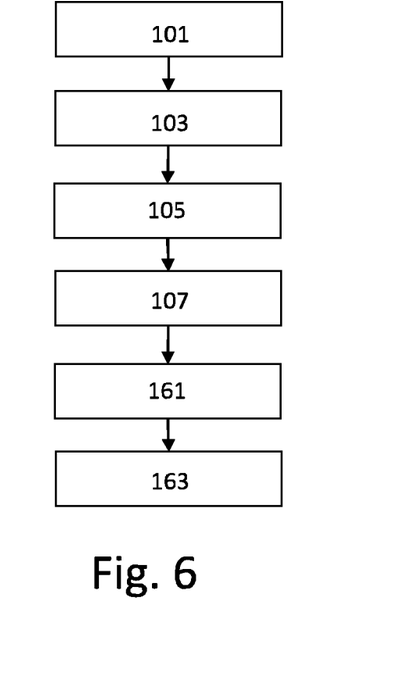
FIG. 6 is a flow diagram of a fourth embodiment of the method.

A fourth embodiment of the method of causing at least one of a plurality of lighting devices to render light effects specified in a light script is shown in FIG. 6. Compared to the first embodiment of FIG. 3, this fourth embodiment comprises two additional steps 161 and 163, which are performed after step 107.

Step 161 comprises receiving a user command requesting playback of the light script to start. Step 163 comprises transmitting a trigger message to the second lighting device. The trigger message triggers the lighting device to start controlling the one or more first lighting devices to render the light effects.

The embodiments of FIGS. 3-6 differ from each other in multiple aspects, i.e. multiple steps have been added or replaced. In variations on these embodiments, only a subset of these steps is added or replaced and/or one or more steps is omitted. As first example, steps 161 and 163 of FIG. 6 may be added to the embodiments of FIGS. 4 and 5. As a second example, steps 121 and 129 may be omitted from the embodiment of FIG. 4 and/or added to the embodiment of FIG. 5 (thereby replacing step 147 of FIG. 5). The embodiments of FIGS. 4 and 5 may be combined.

Figure 7:
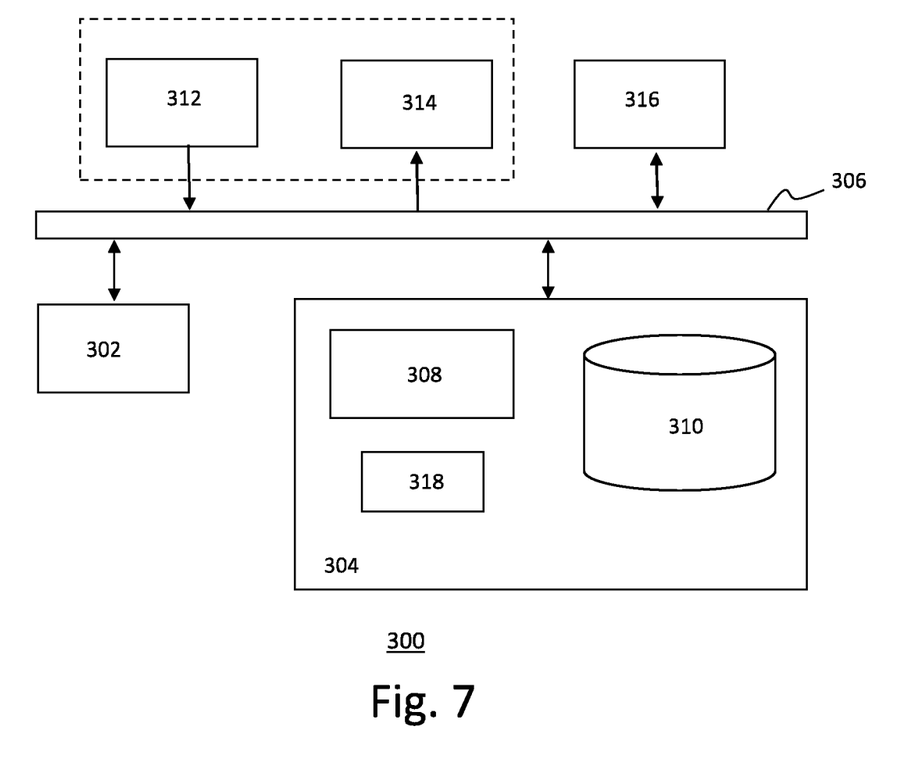
FIG. 7 is a block diagram of an exemplary data processing system for performing the method of the invention.

FIG. 7 depicts a block diagram illustrating an exemplary data processing system that may perform the method as described with reference to FIGS. 3-6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for transmitting light effects specified in a light script to at least one of a plurality of lighting devices, said system comprising:
    at least one transmitter; and
    at least one processor configured to:
        determine for each respective light effect of said light effects an allocation of said respective light effect to one or more first lighting devices of said plurality of lighting devices,
        select, from said plurality of lighting devices, a second lighting device to which none of said light effects has been allocated, and
        transmit, via said least one transmitter, a request to said second lighting device, said request requesting said second lighting device to control said one or more first lighting devices to render said light effects, said request defining said light effects for said one or more first lighting devices as specified in said light script.

2. A system as claimed in claim 1, wherein said at least one processor is configured to select, from said plurality of lighting devices, multiple second lighting devices for which no light effects are specified in said light script and select said second lighting device from said multiple second lighting devices.

3. A system as claimed in claim 2, wherein said at least one processor is configured to select said second lighting device from said multiple second lighting devices based on a resource capability of said multiple second lighting devices, a resource availability on said multiple second lighting devices, and/or a proximity of said multiple second lighting devices to said one or more first lighting devices.

4. A system 4 as claimed in claim 3, wherein said at least one processor is configured to receive resource information from said multiple second lighting devices, said resource information indicating a resource capability of a respective lighting device of said multiple second lighting devices and/or a resource availability on a respective lighting device of said multiple second lighting devices.

5. A system as claimed in claim 4, wherein said resource information is indicative of a total amount of memory, an available amount of memory, a processor type, and/or a processor load of said respective lighting device.

6. A system as claimed in claim 3, wherein said at least one processor is configured to select said second lighting device from said multiple second lighting devices based on said proximity of said multiple second lighting devices to said one or more first lighting devices, and wherein said at least one processor is configured to determine said proximity of said multiple second lighting devices to said one or more first lighting devices based on locations of said multiple second lighting devices and said one or more first lighting devices and/or distances between said multiple second lighting devices and said one or more first lighting devices.

7. A system as claimed in claim 1, wherein said at least one processor is configured to transmit, via said at least one transmitter, a trigger message to said second lighting device after having transmitted said request, said trigger message triggering said lighting device to start controlling said one or more first lighting devices to render said light effects.

8. A system as claimed in claim 1, wherein said at least one processor is configured to receive an original light script, convert said original light script into a different format, and include said converted light script in said request.

9. A system as claimed in claim 1, wherein said at least one processor is configured to receive an original light script and include said original light script in said request.

10. A computer program product for a system according to the system of claim 1, the computer program product comprising computer program code.

11. A method of transmitting light effects specified in a light script to at least one of a plurality of lighting devices, said method comprising:
    determining for each respective light effect of said light effects an allocation of said respective light effect to one or more first lighting devices of said plurality of lighting devices,
    selecting a second lighting device from said plurality of lighting devices for which no light effects are specified in said light script; and
    transmitting a request to said second lighting device, said request requesting said second lighting device to control said one or more first lighting devices to render said light effects, said request defining said light effects for said one or more first lighting devices as specified in said light script.

* * * * *